United States Patent [19]
Bauchot et al.

[11] Patent Number: 6,031,864
[45] Date of Patent: Feb. 29, 2000

[54] METHOD AND SYSTEM FOR CONTROLLING THE TIME OCCUPATION OF SIGNALLING FREQUENCIES IN A FREQUENCY HOPPING SYSTEM

[75] Inventors: Frederic Bauchot, Saint-Jeannet; Frederic Lefevre, Cagnes sur Mer; Francois Lemaut, Nice; Luc Revardel, La Gaude; Roland Amiel, Nice, all of France

[73] Assignee: International Business Machines Corporation, Armonk, N.Y.

[21] Appl. No.: 08/931,322

[22] Filed: Sep. 16, 1997

[30] Foreign Application Priority Data

Oct. 29, 1996 [EP] European Pat. Off. ............. 96480102

[51] Int. Cl.$^7$ ............................. H04B 15/00; H04K 1/00; H04L 27/30
[52] U.S. Cl. ......................... 375/202; 370/326; 370/437; 370/322
[58] Field of Search ..................................... 375/202, 203, 375/200; 370/437, 465, 468, 431, 312, 322, 321, 326, 329

[56] References Cited

U.S. PATENT DOCUMENTS 5,644,576  7/1997  Bauchot et al. ......................... 370/437
5,870,385  2/1999  Ahmadi et al. ......................... 370/252
5,912,918  6/1999  Bauchot et al. ......................... 375/202

*Primary Examiner*—Chi H. Pham
*Assistant Examiner*—Bryan Webster
*Attorney, Agent, or Firm*—John D. Flynn

[57] ABSTRACT

A system and method for controlling the time occupation of signalling frequencies is disclosed, in a frequency hopping system including a plurality of remote stations communicating under control of transceivers with a transceiver of a base station, such communication being performed over a shared medium through a sequence of frequency hopping periods in a plurality of operating frequencies. The method consists in selecting a set of signalling frequencies among the operating frequencies, and interleaving signalling messages transmitted on each signalling frequency within each frequency hopping period to allow a remote station to enter the network for the first time or by re-acquiring synchronization, by scanning each signalling frequency for receiving a signalling message. The method preferably employs structure and techniques for averaging over the sequence of frequency hopping periods the time occupation for data and control messages transmissions on the plurality of signalling frequencies according to the time occupation for signalling messages transmissions.

9 Claims, 6 Drawing Sheets

METHOD AND SYSTEM FOR CONTROLLING THE TIME OCCUPATION OF SIGNALLING FREQUENCIES IN A FREQUENCY HOPPING SYSTEM

TECHNICAL FIELD

The present invention relates to communication systems, and more particularly to an apparatus and method for controlling the time occupation of signalling frequencies according to the time occupation of operating frequencies in a frequency hopping system.

BACKGROUND ART

Frequency hopping is a radio communication technique in spread-spectrum modulation wherein information is transmitted using a plurality of operating frequencies changing at set times to produce a narrow band signal that bounces or hops around in center frequency over the available spectrum.

In a centrally controlled multicellular mobile radio communication system based on slow frequency hopping, each cell has a base station that provides the necessary timing and control information received and used by all the remote stations that belong to the cell.

All stations belonging to a cell, i.e., the base station and all remote stations must hop in synchronism in order to communicate with each other at the same frequency. Different cells will typically operate on different frequency hopping patterns. The control information required to synchronize frequency hopping is broadcasted by the base station. A key problem in the operation of a frequency-hopping based system is that of a rapid acquisition of hop synchronization between one remote station and a base station.

The following references are typical of the background art in the field of frequency hopping systems and synchronization techniques thereof.

U.S. Pat. No. 5,081,641 discloses a method and apparatus for facilitating communication of information in a system without the use of a baseband hopping unit, by sharing a common TDM bus between a plurality of radio communication units, processing units, and information links, where the processing units extract traffic channel information, packetize and/or unpacketize the information, and return same back to the common bus for retrieval by the information links or radio communication units.

In U.S. Pat. No. 4,850,036 entitled, "Radio Communication System Using Synchronous Frequency Hopping Transmissions" a frequency-hopping radio communication system is disclosed comprising a control unit which transmits to and receives from each of a plurality of slave stations using a frequency-hopping mode of operation. During a start-up mode, the control unit communicates a starting message to each slave station using a predefined frequency. The message identifies to each slave station a frequency-hopping sequence to be used to select the frequencies from a group of frequencies for transmission to and reception from the control unit. This message also specifies to each slave station unique starting frequencies in the frequency-hopping sequence at which to begin transmitting and receiving. All slave station transmission are synchronized to the control unit transmissions, thereby preventing any two stations from concurrently using the same frequencies for either transmitting to or receiving from the control unit.

In U.S. Pat. No. 5,446,769 a method for handing off user devices between network control processors (NCPs) in a frequency hopping communication system includes establishing a set of synchronization frequencies for use by the NCPs, informing the plurality of user devices of the synchronization frequency and assigning a synchronization frequency to each respective NCP. Each NCP transmits synchronization at this assigned synchronization frequency during each hopping dwell. Upon a determination that a user device hand-off is necessary, this user device tunes to a synchronization frequency employed by the currently serving NCP and synchronizes its operation to the NCP transmitting synchronization information on the tuned to synchronization frequency.

While the solutions of the prior art are efficient in their environment, the duration for selecting a base station does not comply with the fast base selection duration required for the actual hand-off systems.

Moreover, the use of signalling channels for synchronization purposes as described, does not provide for compliance with various regulations of nations which may be required to control the duration of use of the available frequencies for signalling purposes according to the duration of use of the available frequencies for data transmission.

SUMMARY OF THE INVENTION

It is an object of the present invention to provide a method and system for achieving a reliable and fast base selection in a radio communication system, enabling the possibility to have hand-off between cells.

It is another object of the invention to provide an apparatus comprising means for reducing the duration of synchronization acquisition in a frequency hopping network, while being adaptive to regulations on time occupancy of operation frequencies. In accordance with the invention there is provided an apparatus for controlling the time occupation of signalling frequencies in a frequency hopping communication system comprising at least one base station (26, 28) communicating over a shared medium with a plurality of remote stations (10, 12, 14, 16). The base station comprises means for defining a sequence of frequency hopping periods (80, 81, 82, 83) during which data and control messages transmissions occur on a plurality of operating frequencies (F1, Fi, FN), between the base station and the plurality of remote stations and means for defining a set of signalling frequencies (SF1, SFi, SFN) for transmitting synchronization information to the plurality of the remote stations. The base station further comprises means for selecting the set of signalling frequencies (SF1, SFi, SFN) within the plurality of operating frequencies (F1, Fi, FN), means for adding within each of the frequency hopping periods a plurality of signalling messages, each signalling message being transmitted over the shared medium at an assigned signalling frequency within the set of signalling frequencies; and means for controlling over the sequence of frequency hopping periods the time occupation for signalling messages transmissions of the set of signalling frequencies according to the time occupation for data and control message transmissions of the plurality of operating frequencies. The remote stations further comprise means for selecting the base station upon the reception of at least one signalling message.

In a preferred embodiment, the signalling messages are consecutively inserted at the end of each frequency hopping period.

In yet another embodiment the controlling means consists of computing the duration of the plurality of signalling messages, and reducing the time occupation for data and control messages transmissions of the plurality of signalling frequencies to achieve an equality between the time occupation of each operating frequency.

In a particular embodiment of the invention, the shared medium is a wireless radio frequency channel wherein the frequency hopping period is divided into time slots during which a plurality of data, control and signalling messages are transmitted, the signalling messages being of the type of Hop Header packets, and wherein the means for controlling the duration of use of signalling frequencies are in compliance with the U. S. Federal Communications Commission (FCC) regulation in the 2.4 GHz Band.

DETAILED DESCRIPTION OF THE INVENTION

Figure 1A:
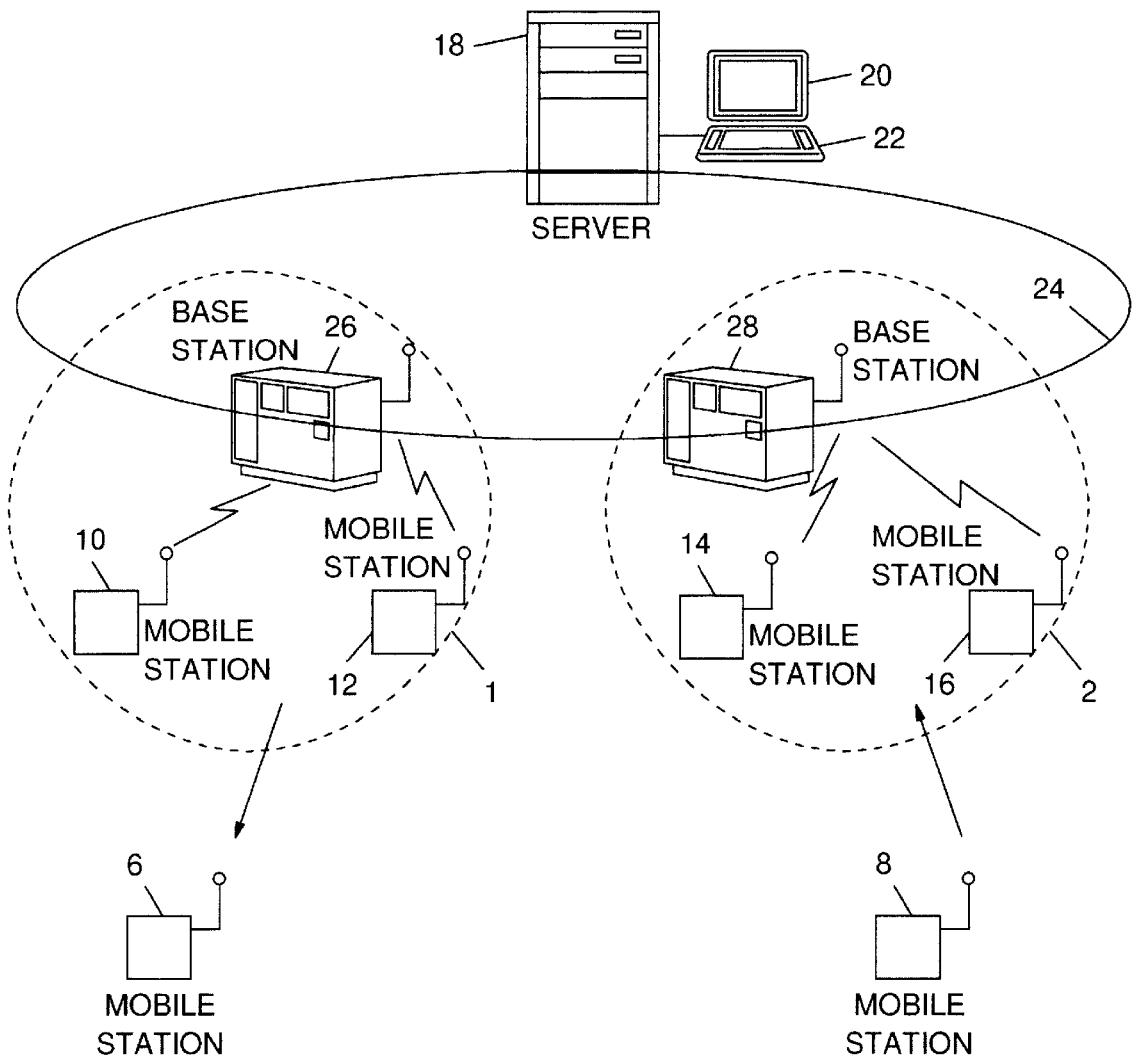
FIG. 1A shows a pictorial diagram showing a typical radio digital data communication system of the type in which the invention is implemented.

Referring now to the drawings, and more particularly to FIG. 1A, there is shown a typical radio system allowing communication between a plurality of mobile stations 10, 12, 14, 16 and applications and data residing in a computing system. The computing system typically includes a Wireless Network Manager (WNM) 18 with attached monitor 20 and keyboard 22 of a Local Area Network (LAN) indicating by reference numeral 24, having a plurality of attached workstations or personal computers (not shown for simplicity). Also attached to the LAN are one or more base stations 26, 28 with which the mobile stations 10, 12, 14 and 16 communicate, and which provide radio system management functions to control the mobile stations' access to the common radio channel. Communications between mobile stations are performed through the base stations.

Figure 1B:
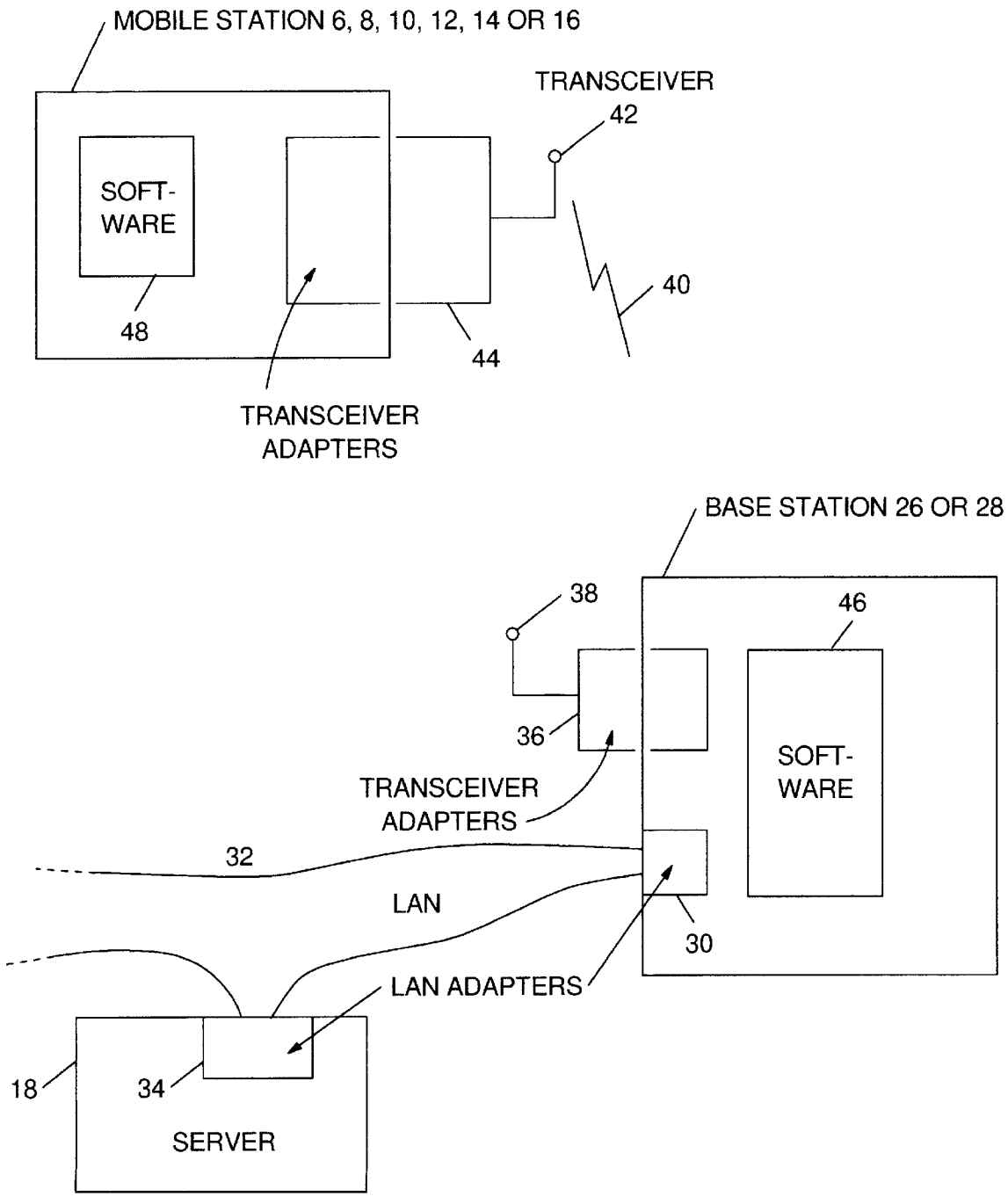
FIG. 1B shows a block diagram of the system shown in FIG. 1A illustrating the basic components of a mobile station and a base station as known in the art.

As shown in more detail in FIG. 1B, a base station 26 or 28, which may be a conventional microcomputer, has a LAN adapter 30 inserted in a bus slot and connected to LAN cabling 32. The WNM 18, typically also a conventional microcomputer and including one or more direct access storage devices (DASDs) such as hard disks (not shown), also has a LAN adapter 34 inserted in a bus slot and connected to LAN cabling 32. The LAN adapters 30 and 34 and LAN cabling 32 together with LAN software constitute the LAN 24. The LAN 24 is of conventional design. The base station 26 or 28 also has an RF transceiver adapter 36 implemented as a printed circuit card which is inserted in a bus slot of the base station. The transceiver adapter 36 includes a spread spectrum transceiver of conventional design. The transceiver adapter 36 has an antenna 38 by which a radio link 40 is established with one or more remote or mobile stations (6, 8, 10, 12, 14, 16). The mobile station may itself be a hand held or lap top computer of conventional design and, like the base station, it is provided with an antenna 42 and a transceiver adapter 44, also implemented as a printed circuit card which is inserted in a bus slot of the computer. The transceiver adapter 44, like transceiver adapter 36, includes a spread spectrum transceiver of similar design. The base station and the mobile stations are further provided with software, respectively indicated by reference numerals 46 and 48 which support their respective transceiver adapters.

Figure 2:
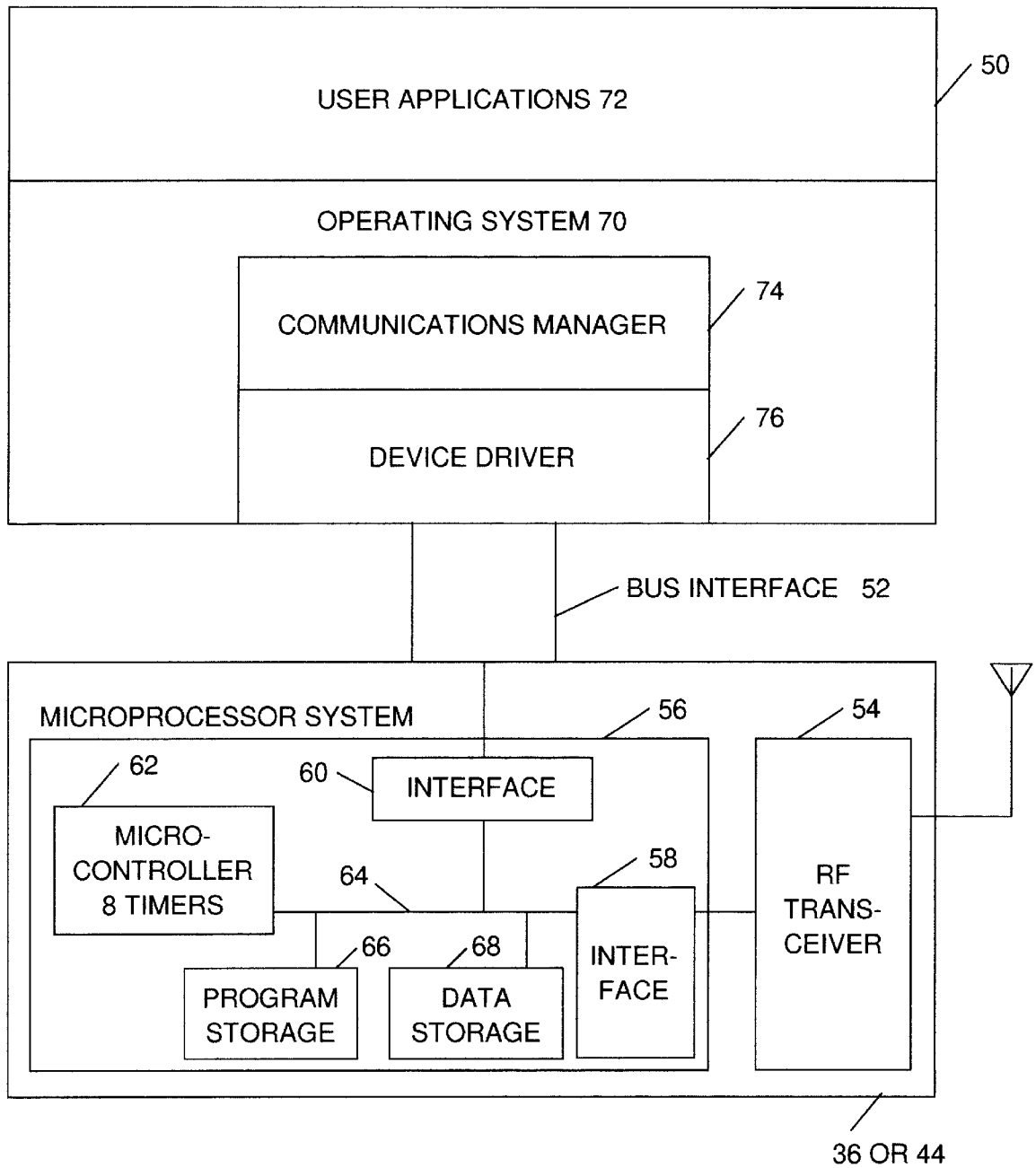
FIG. 2 shows a block diagram of the radio system used in the implementation of a preferred embodiment of the invention.

FIG. 2 shows the radio system common to both the mobile stations and the base stations of FIG. 1. The radio system includes a transceiver adapter 36 or 44 connected to the computer 50 via the computer's bus interface 52. The transceiver station is itself divided into an RF transceiver 54, which may be a commercially available spread spectrum transceiver, and a dedicated microprocessor system 56 which controls the transceiver via an interface 58. The microprocessor system 56 further includes a system interface 60 which interfaces the transceiver section to the computer section 50. The microprocessor system includes a dedicated micro controller 62 containing high-resolution interval determination hardware or "timers" typical of real-time microprocessor systems.

Micro controller 62 is connected by a memory bus 64 to program storage 66 and data storage 68 as well as to interfaces 58 and 60 providing attachment to bus interface 52 and RF transceiver 54, respectively. Program storage 66 is typically read only memory (ROM), while data storage 68 is static or dynamic random access memory (SRAM or DRAM). Packets received or to be sent are held in data storage 68 and communicated to or from the RF transceiver 54 via interface 58 under control of serial channels and a direct memory access (DMA) controller (not shown) which is part of the microprocessor 62. The function of these serial channels is to encapsulate data and control information in an HDLC (high-level data link control) packet structure and provide the packet in serial form to the RF transceiver 54. For more information on the HDLC packet structure, see for example, Mischa Schwartz, Telecommunication Networks: Protocols, Modeling and Analysis, Addison-Welsey (1988).

When a packet is received through the RF transceiver 54, the serial channels check the packet destination address, check for errors, and deserialize the packet to data storage 68. The serial channels must have the capability to recognize a specific adapter address as well as a broadcast address. Specific microprocessors with appropriate serial channel and timer facilities include the Motorola 68302 and the National HPC46400E microprocessors.

The computer 50 runs an operating system 70 which supports one or more user application programs 72. The operating system 70 may include a communications manager 74, or the communications manager 74 may itself be an application program installed on the computer. In either case, the communications manager 74 controls a device driver 76 via the operating system 70. The device driver 76, in turn, communicates with the transceiver adapter 36 or 44 via bus interface 52.

Figure 3:
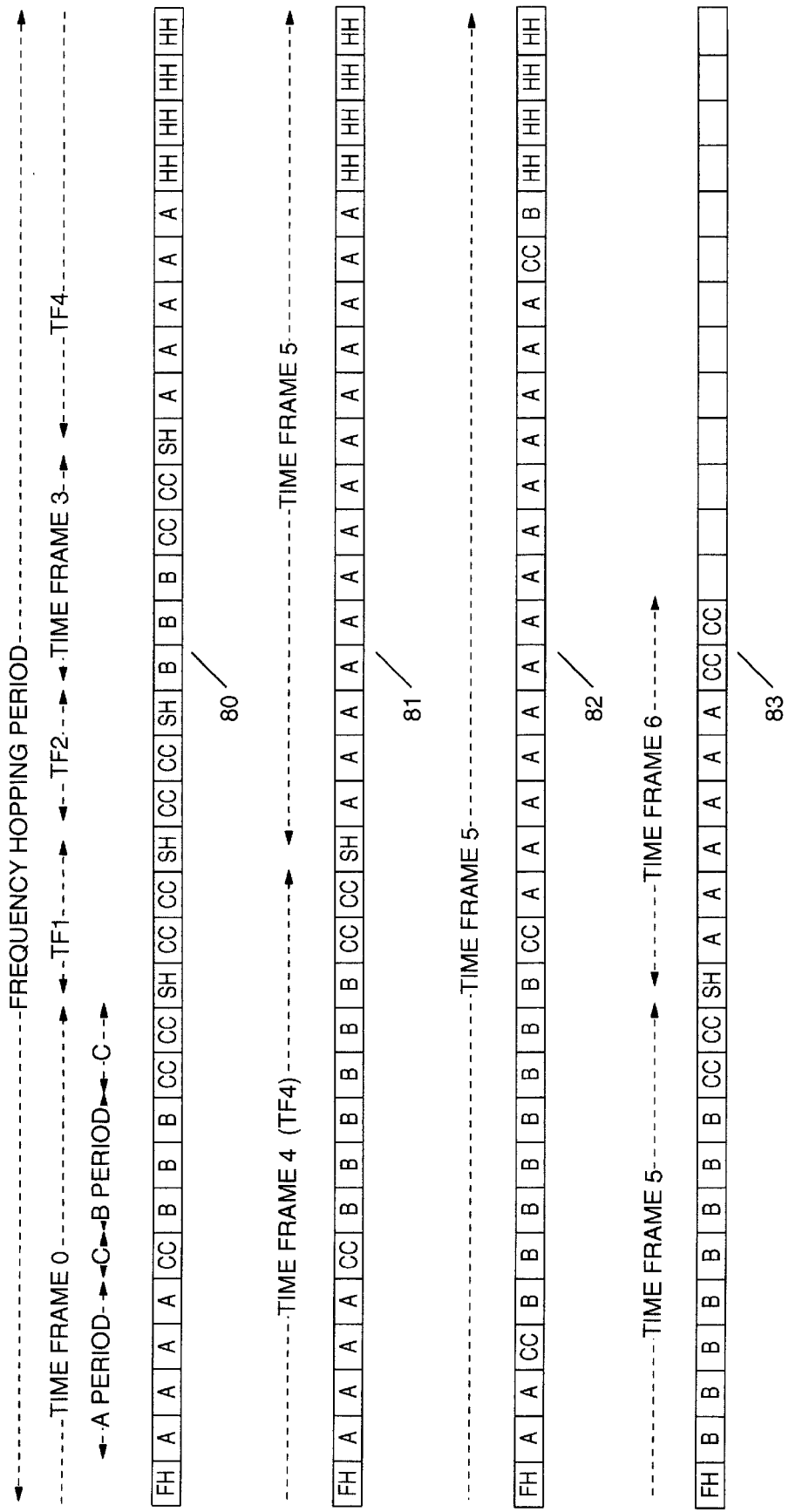
FIG. 3 is a diagram of the frame structure of the MAC protocol of the invention.

Referring now to FIG. 3, a Medium Access Control (MAC) protocol as used in a preferred embodiment is described. The proposed scheme is based on a sequence of frequency hopping periods (THOP), currently designated as a superframe, during which transmissions of data occur over a range of operating frequencies (F1, Fi, FN). The superframe is divided into time frames (TF0, TF1, . . . , TF6) of variable length, each time frame being composed of time slots of different types, generally represented as (A, B, C) for data exchanges, and header packets generally represented as (FH, SH, HH) for transmitting frame structure information and hopping information. Each line (80, 81, 82, 83) represents a frequency hopping period (THOP) divided in a fixed number (Ns) of time slots of the types (A, B, C) and headers packets (FH, SH, HH). The structure and the length of a time frame is traffic dependent, all time frames are started with a (SH) type header packet which describes the structure of the frame, followed by interleaved sequences of contiguous type A, type B or type C time slots, each sequence of contiguous time slots of the same type being designated as a period (A period, B period, C period). It should be understood that the invention is not limited to the referenced MAC protocol, but may be implemented with other schemes such as protocols using time division fixed frame structure.

During type A time slots, the radio link is used for outbound data transfer from the base station to remote stations and acknowledgements in the reverse direction. Both control and data outbound traffic occurs within A slots. During type B time slots, the radio link is used for reservation-based inbound data transfer from the remote stations to the base station and acknowledgements in the reverse direction. Only inbound data traffic occurs within B slots. During type C time slots, the radio link is used for contention based inbound data transfer from remote stations to the base station and acknowledgements in the reverse direction. However, the person of ordinary skill in the art can easily devise other arrangements in which type C slots are used for direct communication between remote stations without using the base station as a relay. Both control and data traffic may occur within C slots, which may be grouped by pairs generally referred to as (CC). Type A and type B time slots may have the same duration and be equal to twice the duration of a type C time slot. Slot allocation is performed by a scheduler resident in the base station adapter 26 or 28 in FIGS. 1A–B. Time slots are allocated in each time frame for inbound and outbound transfers according to instantaneous traffic conditions, the time frame operation being variable as can be seen from the examples shown in FIG. 3 (time frame 0 to time frame 6). The detailed structure of the headers packets as well as a full description of the preferred MAC protocol may be found in EP 0 709 982 A1.

According to the invention, hopping information is transmitted on signalling frequencies (SF1, SF1, SFN) which are a set of frequencies selected within the set of the operating frequencies. The selection of the signalling frequencies may be based on environment constraints such as the interference management, but is not detailed here.

The hopping information is transmitted during time slots of Hop Header packets, generally referred as (HH) which are added to the time frames during each frequency hopping period. Each Hop Header packet (HH) added during a frequency hopping period is transmitted on an assigned signalling frequency SFi, and all the signalling frequencies are used during a frequency hopping period. In a preferred embodiment, the set of signalling frequencies is the same for different networks allowing a remote station to acquire fast synchronization with any base station of a network.

Figure 4:
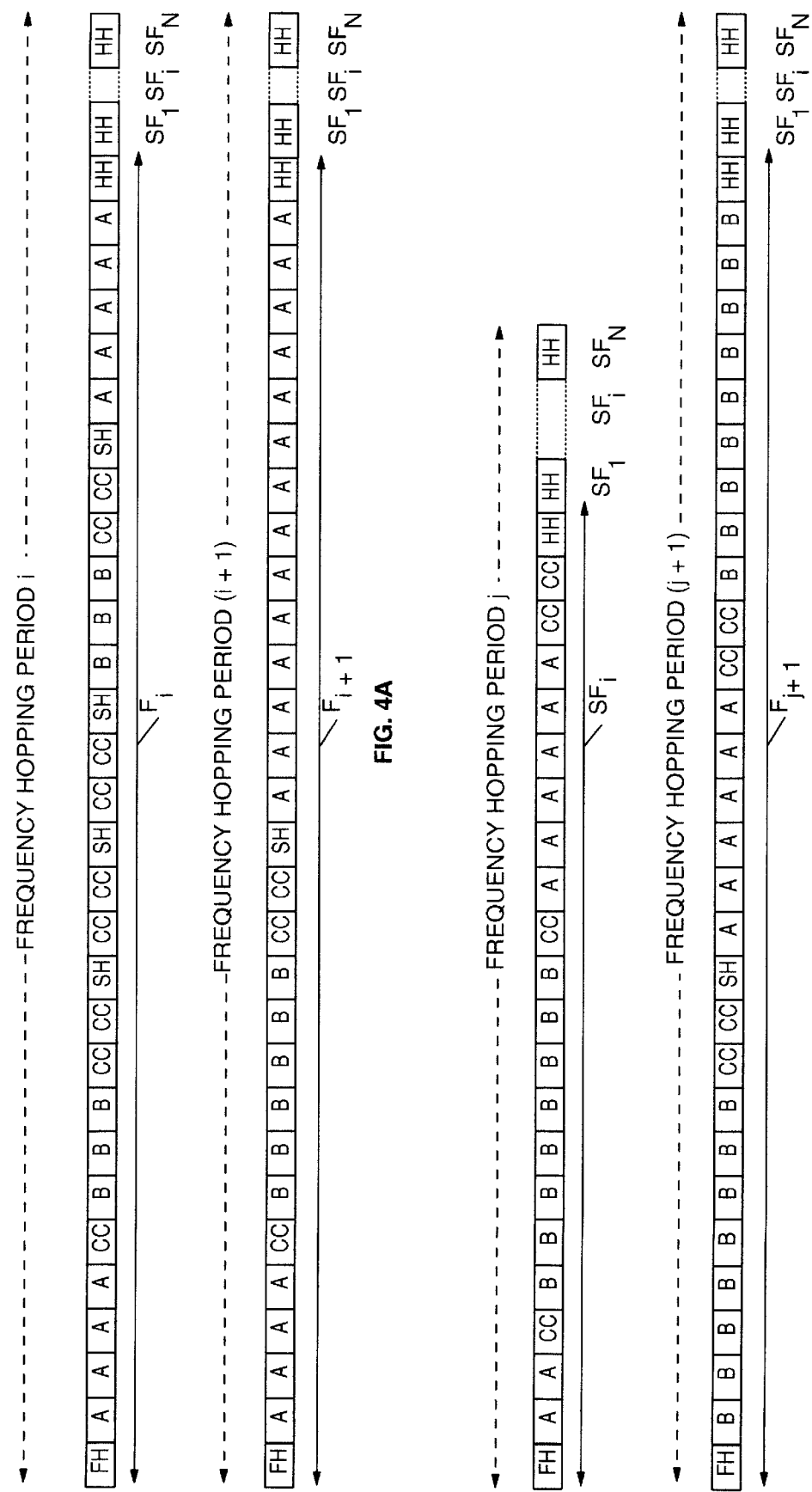
FIG. 4 illustrates the computation of the time occupancy on operating and signalling frequencies.

While the signalling frequencies are used according to the invention for synchronization purposes (and are referred to synchronization frequencies as well as signalling frequencies in the description), they are also used as any other operating frequency to transmit data and control messages during a frequency hopping period. Therefore, as illustrated in FIG. 4A and FIG. 4B, the superframe may include two kinds of frequency periods. A first type as shown in FIG. 4A are frequency hopping periods wherein data exchanges occur on an operating frequency (Fi, Fi+1) and transmission of synchronization information occur on the signalling frequencies (SF1, SFi, SFN). A second type as in FIG. 4B are frequency hopping periods wherein transmissions of data occur on a signalling frequency (SFi) and transmission of synchronization information occur on the signalling frequencies (SF1, SFi, SFN).

Because of constraints due to some regulatory Agencies (i.e., Federal Communications Commission) which seek fair use of each frequency within the available frequencies of a hopping pattern, a characteristic of the invention is to control the time occupation of the signalling frequencies. The time occupation of the signalling frequencies for data and control messages transmissions is set according to the time occupation for synchronization messages transmissions. In a preferred embodiment, this goal is achieved by reducing the time spent on signalling frequencies (SFi) when transmitting data and control messages in order to comply with the FCC rules 15.247 governing frequency hopping devices, but the invention is not limited to compliance with FCC rules 15.247 and a person of ordinary skill in the art could adapt the solution in order to comply with other regulations pertinent to other nations or geographies in the world.

Referring back to FIG. 3, an embodiment of the invention wherein the Hop Header packets (HH) are added at the end on each frequency hopping period is illustrated. The (HH) packets are sent on the signalling frequencies before switching to the next operating frequency within the hopping pattern. They are used by registering remote stations to select a base station according to the process described below with reference to FIG. 5. Each Frequency Header packet (FH) is sent on a new operating frequency after the last Hop Header packet (HH) has been sent in the previous hopping period. (FH) packet is used for synchronization between the base station and remote stations and for hopping pattern tracking. It also provides traffic information for power saving purposes. A Slot Header (SH) is sent at the beginning of each time frame and carries traffic information representative of the structure of the time frame describing the sequence of interleaved type A, type B and type C periods within the current time frame. Each period is then defined by the A, B or C type periods, the number of slots, the destination and source address of the slots. In a particular embodiment of the invention source and destination addresses can be used for type C slots allocated for direct transmission between two remote stations without using the base station as a relay. Referring now to the first frequency hop 80 in FIG. 3, it shows the last portion of time frame 0 which consists of four type A slots for outbound traffic followed by one type C pair for contention-based inbound data and control traffic, three type B slots for reservation based inbound data traffic and again two type C pairs. It is assumed that the (SH) header corresponding to time frame 0 was sent during the previous frequency hop and not represented in this figure. Time frame 1(TF1) follows time frame 0, and starts with a (SH) header, followed by two type C pairs. This time frame represents the longest possible inactivity period during which no traffic occurs. The structure of time frame 2 is identical to time frame 1. Time frames 1 and 2 are illustrative of the traffic sent by an idle base station. Time frame 3 comprises three type B slots dedicated to reservation based inbound traffic followed by two type C pairs. This is the kind of traffic experienced when there is no outbound message from the base station to the remote stations. Time frame 4 spills over a frequency hop boundary located before a (FH) header at the beginning of the second hopping period, and represented by a (HH/FH) headers sequence. In a preferred embodiment, the (HH/FH) headers sequence is composed of four (HH) headers, the first one being sent on the current operating frequency while each of the three last ones being sent each one on an assigned signalling frequency. Furthermore, each (HH) signalling header may be sent during a time slot, but the person of ordinary skill in the art can devise other arrangements wherein several signalling headers are sent during a unique time slot in order to decrease the time spent for signalling purposes, whereas having more time for data transmission. For example, the four Hop Headers shown in FIG. 3 may be transmitted during three contiguous time slots but a different number of time slots may be chosen. Time frame 4 consists of a (SH) header followed by nine type A slots, one type C pair, six type B slots and two type C pairs. The (HH/FH) headers sequence is inserted after the five first type A slots of time frame 4. Time frame 5 spills over two frequency hop boundaries represented again by (HH/FH) headers sequences. It comprises sixteen type A slots, followed by one type C pair, eight type B slots, one type C pair, fourteen type A slots, one type C pair, nine type B slots and two type C pairs. Both time frame 4 and 5 are representative of highly loaded traffic conditions. They show how a time frame may extend over two or more frequency hops. In addition, time frame 5 shows how different types of slots can be interleaved in the same time frame. It should be noted that the (HH) and (FH) headers are transmitted on a cyclic basis corresponding to the fixed frequency hopping period THOP, whereas the (SH) headers are sent at variable intervals depending on traffic conditions.

For clarity of the description, the different parameters used in explaining FIGS. 4A and 4B are expressed as follows:

Lhop: Frequency Hopping Pattern Length

N: Number of Signalling Frequencies (SFi)

Tsp: Duration of a Hop Header Packet (HH)

Ts: Average time slot occupation during a superframe

Ns: Number of time slots per frequency hopping period

NTs: Number of time slots to transmit all the (HH) Hop Header packets during a Frequency Hopping Period.

FIG. 4A is a schematic of a Frequency Hopping Period (I) during which data are transmitted over an operating frequency Fi, followed by signalling information transmitted over reserved signalling frequencies (SF1, SFi, SFN). The operating frequency Fi in this first example is not one of the reserved signalling frequencies, and therefore Fi is used only during the Hopping Period Fi within the superframe. The time occupation of frequency Fi during the superframe may be represented by the following equation:

$$T(Fi)=(Ns-NTs) \times Ts \qquad (1)$$

It should be clear that the time occupation of each operating frequency Fi is equal to T(Fi).

On the other hand, with reference to FIG. 4B, a schematic of a Frequency Hopping Period (j) during which data are transmitted over an operating frequency SFi which is also a signalling frequency is illustrated. It is clear that the time occupation of the frequency SFi would be greater than the time occupation of other operating frequencies if no means to control the time occupation of each signalling frequency is implemented. In fact, SFi would be used during each frequency hopping period to transmit (HH) signalling messages and would also be used to transmit data and control messages during a corresponding full hopping period.

Therefore, the use of the signalling frequency for data transmission is reduced during the frequency hopping period SFi. Particularly, in order to comply with FCC rules, the reduction must be equal to the time spent transmitting (HH) packets for signalling purposes on frequency SFi during the duration of a superframe, I.e., during the complete base station frequency hopping pattern. This reduction counted in a number of time slots may be represented as:

$$R=(Tsp \times Lhop)/Ts \qquad (2)$$

Then the reduced number (Nab) of time slots during the SFi frequency hopping period may be expressed as:

$$Nsb=Ns-R \qquad (3)$$

Finally, the time occupation of frequency SFi during a superframe is characterized by the following equation:

$$T(SFi)=(Nsb-NTs) \times Ts+(Lhop \times Tsp) \qquad (4)$$

Equation (4) may be rewritten with respect to equation (3), and then shows that the signalling frequency occupation is therefore the same for all operating frequencies, which is expressed by the equality of equations (1) and (4).

Figure 5:
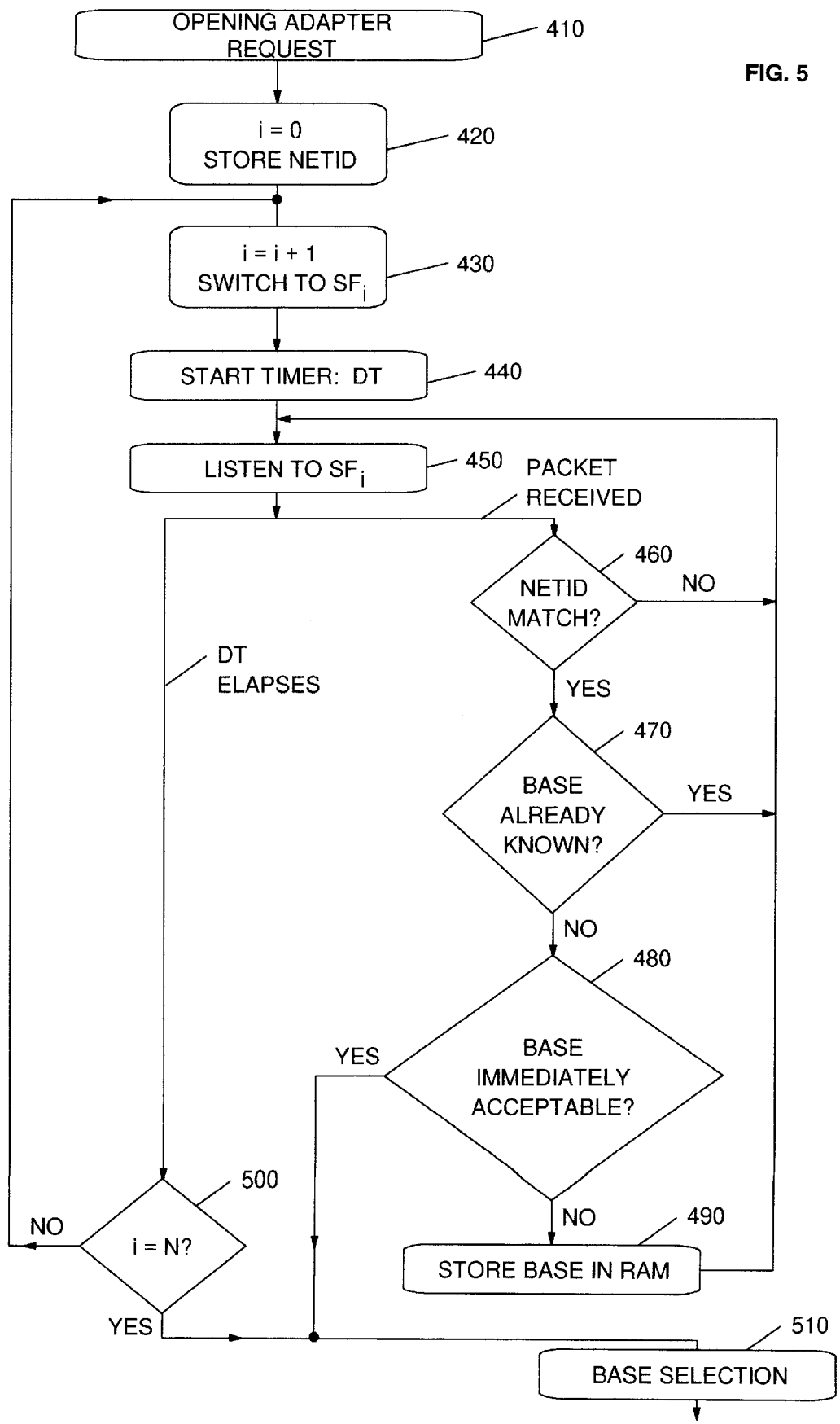
FIG. 5 is a flow chart of the monitoring and selection phases of the synchronization technique of the present invention.

Referring now to FIG. 5, the initial pattern acquisition steps are shown. When a remote station is first turned on, it does not know of the surrounding base stations and what frequency hopping patterns they have. However, it is assumed that the remote station has knowledge of both the hop length and the signalling frequencies SFi used by the neighboring base stations. A remote station attachment depends on executing the algorithm shown in FIG. 5 for selecting its home base.

The flow diagram of the process is performed by the microprocessor system 56 of the transceiver adapter 44 of a registering mobile station 8 listening to its radio environment when it is first opened. It first receives, as depicted in function block 410, a transceiver adapter opening request from computer 50 via the computer bus interface 52. This opening request comprises a network identifier NETid of the logical network in which to register. The microprocessor system 56 of registering mobile station 8 stores NETIid in Data Storage 68 (step 420). It is assumed that registering mobile station 8 wants to register in a logical network comprising network cell 2 owned by base station 28 as depicted in FIG. 1. The mobile station 8 in step 420 sets a variable I to zero, wherein "I" is the index for the set of signalling frequencies SFi. In function block 430, mobile station 8 switches to a frequency SFi, out of the set of the N signalling frequencies SFi, and the index "I" is incremented. In step 440, the mobile station 8 starts a timer DT during the listening duration of signalling frequency SFi, which is a dwell time duration. In next step 450, registering mobile station 8 listens to receive a packet in any type of time slots (FH, HH, SH, A, B, C) which is sent by any station (base or remote) in the cell. Upon receiving a packet, registering mobile station 8 waits for the occurrence of a header section (FH) and checks that the network identifier NETid of the base station matches the network identifier NETid stored in Data Storage 68, as depicted in step 460. If it does not match (branch NO), the registering mobile station 8 ignores this base station and keeps listening to the selected signalling frequency SFi (step 450) until it receives any other type of packet (FH, HH, SH, A, B, C), or until the end of the timer duration DT (branch DT elapses). If the network identifier NETid of the received header section corresponds to the NETid stored in Data Storage 68 (branch YES), registering mobile station 8 checks on step 470 if the base station address carried by the header section (FH) is an element of a list of owner base stations which are candidates identified during previous frequency iterations. If it is already recorded, it means that the same base station was previously found while listening to the registering mobile station radio environment, therefore the process loops back to step 450 and registering mobile station 8 keeps listening to the same signalling frequency SFi until it receives any packet or until the end of the timer duration. If the base station identifier was not previously found, function block 480 is performed. Registering mobile station 8 checks if the strength of the signal received (the so-called RSSI) from the base station is greater than a given threshold, and checks if the number of mobile stations connected to this base station is not too high (compared to a given so-called Load Factor LF) in order not to overload the cell. If these two criteria are met (branch YES), the operation of the base selection of step 520 consists in selecting this last base station as the home station. If the result of the test is NO (one of the two or both criteria not met) then, on step 490, the base address, the strength of the received signal and the number of the mobile stations connected are stored in a Data Storage 68. Then the process returns to step 450. In step 450, if the timer of DT duration elapses, step 500 is performed. On step 500, the value of "I" is checked. If it is equal to the number N of signalling frequencies, which means that all the signalling frequencies have been scanned, then the base selection process 510 is performed. If "I" is not equal to N, then the process loops back to step 430, and mobile station 8 picks the next signalling frequency SFi+1.

In the preferred embodiment of the invention, the duration of the various headers, slots and hops may take the following values:

Ts=1.8 milliseconds (ms)
SH=2×Ts
A and B slots=2×Ts
C slots=Ts
FH=Ts
DT=100 ms
Ns=50
NTs=2, 3
N=3
Tsp=0.33 ms
Lhop=75

With such parameters, in less than 100 ms the remote station has received a (HH) packet from the base station, if there is no interference on the signalling channel. This value is to be compared with an average duration of 3.5 s assuming the technique described in previously cited document EP 0658 023 A1.

While the invention has been particularly shown and described with reference to a preferred embodiment, it will be understood by those skilled in the art that various changes in form and detail may be made therein without departing from the spirit and scope of the invention.

What is claimed is:

1. An base station apparatus for controlling the time occupation of signalling frequencies in a frequency hopping communication system communicating over a shared medium with a plurality of remote stations said apparatus comprising:

means for defining a sequence of frequency hopping periods during which data and control message transmissions occur on a plurality of operating frequencies between said apparatus and said plurality of remote stations;

means for defining a set of signalling frequencies for transmitting synchronization information to said plurality of remote stations;

means for selecting said set of signalling frequencies within said plurality of operating frequencies;

means for adding within each said frequency hopping periods a plurality of signalling messages, each signalling message being transmitted over said shared medium at an assigned signalling frequency within said set of signalling frequencies; and means for controlling over said sequence of frequency hopping periods the time occupation of said set of signalling frequencies for signalling transmissions according to the time occupation of said plurality of operating frequencies for data and control message transmissions.

2. The apparatus of claim 1 wherein said adding means further comprises a means for inserting consecutive signalling messages (HH) within each said frequency hopping period.

3. The apparatus of claim 2 wherein said means for inserting consecutive signalling messages comprise means for inserting said consecutive signalling messages at the end of each said frequency hopping period.

4. The apparatus of claim 1 wherein said controlling means further comprises a means for computing the duration of said plurality of signalling messages, and means for reducing the time occupation for data and control messages transmission of said set of signalling frequencies.

5. The apparatus of claim 1 wherein said shared medium is a wireless radio frequency channel, and each said plurality of signalling messages is a Hop Header packet.

6. The apparatus of claim 1 wherein each said frequency hopping period is divided into time slots, and wherein said plurality of signalling messages is transmitted over at least one of said time slots.

7. The apparatus of claim 6 wherein said plurality of signalling messages are transmitted over a number of time slots different than the number of said signalling messages.

8. A method for controlling the time occupation of signalling frequencies in a frequency hopping communication system comprising at least one base station communicating over a shared medium with a plurality of remote stations, said method comprising the steps of:

defining a sequence of frequency hopping periods during which data and control messages transmissions occur on a plurality of operating frequencies between said at least one base station and said plurality of remote stations;

defining a set of signalling frequencies for transmitting synchronization information to said plurality of remote stations;

selecting said set of signalling frequencies within said plurality of operating frequencies;

adding within each said frequency hopping periods a plurality of signalling messages, each signalling message being transmitted over said shared medium at an assigned signalling frequency within said set of signalling frequencies; and controlling over said sequence of frequency hopping periods the time occupation of said set of signalling frequencies for signalling transmissions according to the time occupation of said plurality of operating frequencies for data and control messages transmissions.

9. A system for controlling the time occupation of signalling frequencies in a frequency hopping communication system having at least one base station communicating over a shared medium with a plurality of remote stations said system comprising:

means for defining a sequence of frequency hopping periods during which data and control message transmissions occur on a plurality of operating frequencies between said apparatus and said plurality of remote stations;

means for defining a set of signalling frequencies for transmitting synchronization information to said plurality of remote stations;

means for selecting said set of signalling frequencies within said plurality of operating frequencies;

means for adding within each said frequency hopping periods a plurality of signalling messages, each signalling message being transmitted over said shared medium at an assigned signalling frequency within said set of signalling frequencies;

means for controlling over said sequence of frequency hopping periods the time occupation of said set of signalling frequencies for signalling transmissions according to the time occupation of said plurality of operating frequencies for data and control message transmissions means for selecting said base station upon receiving at least one of said signalling messages at a remote station.

* * * * *